United States Patent [19]
Crescenzo et al.

[11] Patent Number: 5,640,855
[45] Date of Patent: Jun. 24, 1997

[54] PORTABLE COOLER FOR GOLF BAG

[76] Inventors: Kevin S. Crescenzo, 2920 Hannah Ave., Apartment H275, Norristown, Pa. 19401; Joseph M. DiFlorido, 2305 Adams Ct., North Wales, Pa. 19454

[21] Appl. No.: 473,317

[22] Filed: Jun. 7, 1995

[51] Int. Cl.[6] ............................................. F25D 3/08
[52] U.S. Cl. .................. 62/457.5; 62/371; 206/315.3
[58] Field of Search .................. 62/457.5, 457.1, 62/457.2, 457.7, 457.9, 372, 373; 206/315.1, 315.3

[56] References Cited

U.S. PATENT DOCUMENTS

| | | | |
|---|---|---|---|
| 4,266,407 | 5/1981 | Gibson | 3/8 |
| 4,295,345 | 10/1981 | Atkinson | 62/457.5 |
| 4,343,158 | 8/1982 | Campbell | 3/8 |
| 4,628,705 | 12/1986 | Nave | 62/457.5 |
| 4,655,052 | 4/1987 | Garcia | 11/2 |
| 4,858,444 | 8/1989 | Scott | 3/8 |
| 5,007,250 | 4/1991 | Musielak | 3/8 |
| 5,024,067 | 6/1991 | Maier, II | 3/8 |

FOREIGN PATENT DOCUMENTS 2025593  1/1980  United Kingdom ............... 62/457.5

OTHER PUBLICATIONS

Golf Bag Bottle Holder, #15-38087-6, published by Signatures® in Spring, 1995 mailings.

*Primary Examiner*—John M. Sollecito
*Attorney, Agent, or Firm*—Synnestvedt & Lechner

[57] ABSTRACT

A portable cooler which more efficiently maintains a desired low temperature for prepackaged beverages. The portable cooler completely encapsulates the prepackaged beverage thereby reducing the overall volume of the reusable ice substitute. In addition, the outer surface of the reusable ice substitute is designed to accommodate a particular application.

19 Claims, 5 Drawing Sheets

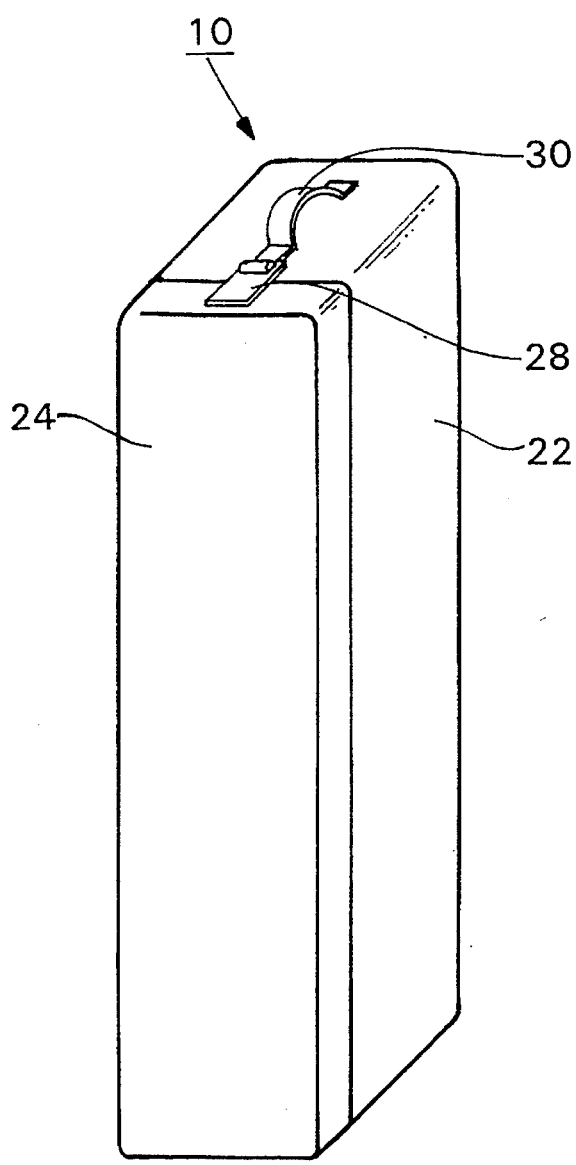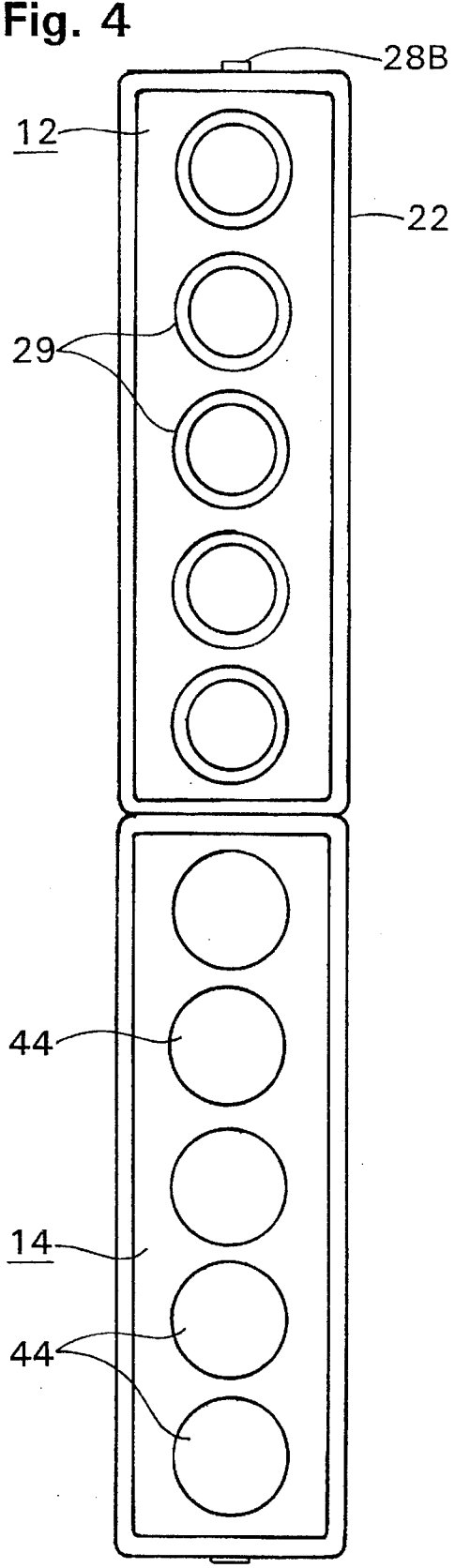

PORTABLE COOLER FOR GOLF BAG

FIELD OF THE INVENTION

This invention relates generally to a cooler and, more specifically, to a portable cooler which can be stored inside a compartment of a golf bag.

BACKGROUND OF THE INVENTION

Portable coolers for use in keeping beverage containers and prepackaged beverages at a chilled temperature are known. Many portable coolers consist of a small ice chest made from an insulative material which separates an interior volume from the relatively warm ambient surroundings (i.e., air). Ice—or reusable ice substitutes—and the beverage containers are placed inside the ice chest. The interior volume of the cooler is cooled to a temperature substantially below that of the ambient air and approaches the temperature of the melting ice. However, air is a poor conductor of heat and the transfer of heat energy from the beverage containers is inefficient. The insulative material helps to maintain this lower temperature for an extended period of time thereby keeping the beverages at a desired drinking temperature.

The reusable ice substitutes (sometimes referred to as freeze-packs) are hollow plastic containers filled with a refrigerant. The refrigerant may be a liquid (e.g., water, salt water, etc.) or a gel-like substance. The refrigerant becomes solid when placed in a freezer. The reusable ice substitutes are sometimes designed with scallops to accommodate beverage containers. The scalloped reusable ice substitutes help in resisting movement of the beverage containers within the interior volume of the cooler. However, the utilization of these reusable ice substitutes in portable coolers tends to make the cooler awkward and bulky. In addition, they may decrease the accessibility or removability of the beverage containers from the cooler.

SUMMARY OF THE INVENTION

The instant portable cooler is a fully integrated system for storing, chilling and transporting prepackaged containers, and in particular beverage cans and bottles. The instant portable cooler includes a storage base having a closed end and an open end for receiving the containers. Preferably, a lid means is used to seal the open end of the base. The storage base and the lid means are made of one or more reusable ice substitute means.

The open end of the storage base comprises a storage receptacle for accommodating and receiving a container. In the preferred embodiment, there are five receptacles, each having a substantially cylindrical shape. Preferably, the length of the cylindrical receptacle is slightly less than the length of a typical twelve-ounce beverage can, and the diameter of the cylindrical receptacle is slightly larger than the diameter of a typical twelve-ounce beverage can.

The lid means communicates with the storage base for completely sealing off the receptacles from the ambient air. The lid means may have a substantially cylindrical nook for separately accommodating the portion of the beverage container which extends beyond the storage base. Further, the lid means may include a sealing recess around its perimeter for sealable mating with a lip or ridge around the storage base.

Since the entire surface area of the beverage containers are surrounded by the reusable ice substitutes, the heat transfer from the beverage containers to the reusable ice substitutes is highly efficient. Accordingly, the beverages are cooled to a desirable drinking temperature quicker than is possible with previous coolers and stay colder for a longer period of time. Further, the instant coolers can be made smaller to hold the same number of beverage containers. Therefore, the reusable ice substitute means used for the base and the lid can be made thinner, thus requiring less refrigerant, and reducing the overall weight of the cooler.

In an alternate embodiment, the reusable ice substitute means is designed in order to facilitate its transportation. For example, many portable coolers are used and reused in the same application. That is, a golfer, fisherman, or racquetball player would use the portable cooler in the same manner repeatedly. The portable cooler may have an outside surface which is sculpted to accommodate the particular user's requirements. For example, by shaping the outer surface of the storage base into a concave surface, it can be designed to fit into a pocket of a golf bag, thereby allowing the instant cooler to be more easily transported.

The objects and advantages of the subject invention will become apparent after considering the following description and the accompanying drawings.

BRIEF DESCRIPTION OF THE DRAWINGS

FIG. 3 is a perspective view of the cooler of FIG. 1 with the lid in its closed condition.

FIG. 4 is a front view of an alternate embodiment of a portable cooler in accordance with the instant invention with the lid in its open condition.

DETAILED DESCRIPTION OF THE PREFERRED EMBODIMENT

Figure 1:
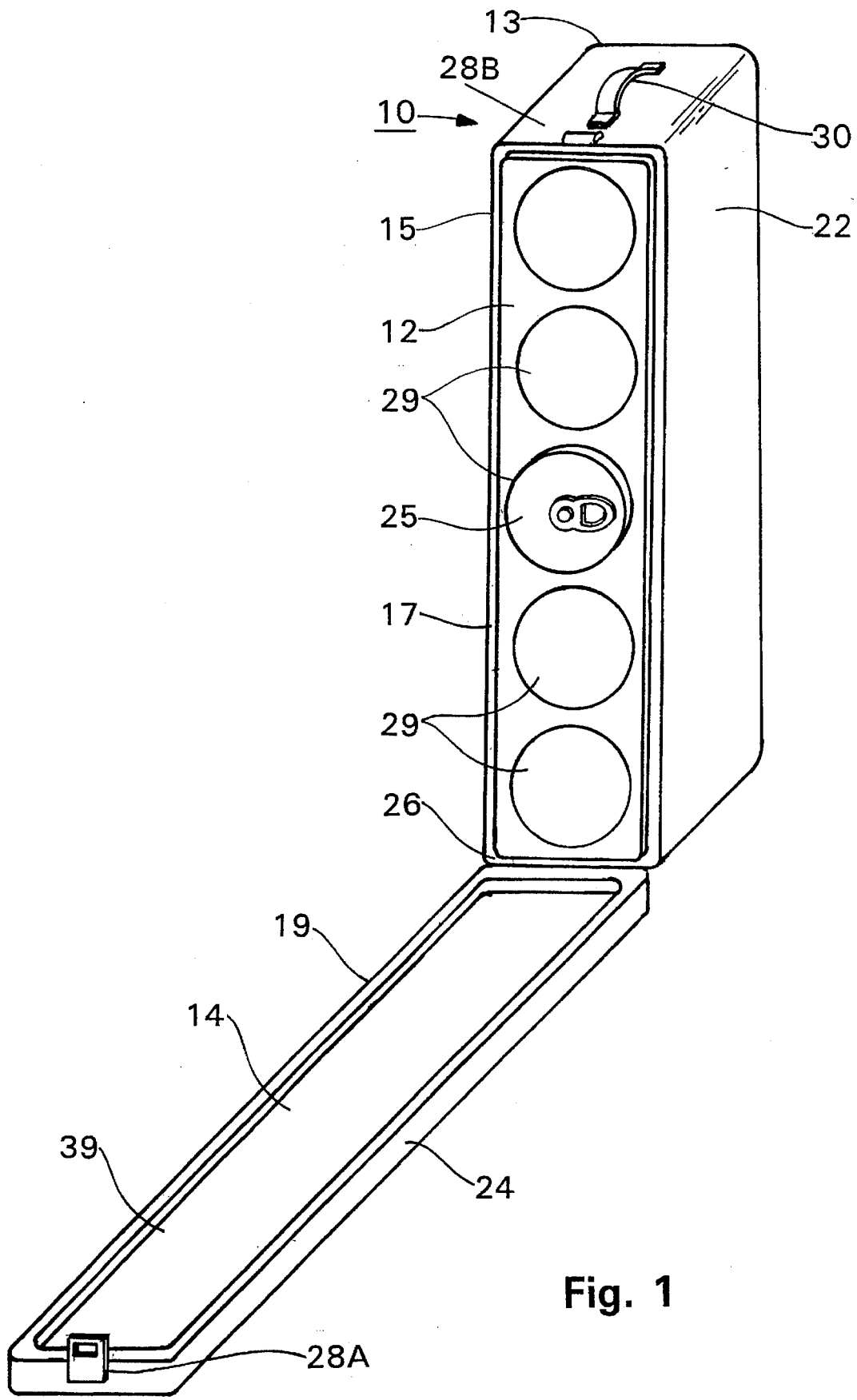
FIG. 1 is a perspective view of a portable cooler in accordance with the instant invention with the lid in its open condition.

Referring to the drawings, the portable cooler in accordance with the present invention is generally designated by reference numeral 10. As shown in FIG. 1, the portable cooler 10 consists of a storage base 12 for receiving and holding at least one item. The storage base 12 preferably has three closed sides including a backside 13. The storage base 12 also has an open front side 15. (It should be noted that the generally rectangular shape of the portable cooler shown in the accompanying drawings is illustrative and not meant to limit the scope of the invention. It would be readily apparent to one skilled in the art that the storage base 12 can be made into virtually any configuration.)

The storage base 12 is comprised of a reusable ice substitute means. The reusable ice substitute means consist of a rigid, semi-rigid or flexible hollow structure filled with a refrigerant, e.g., water although other suitable refrigerants are well-known in the art. (See for example LIFOAM® freezer packs, manufactured by Leisure Products of Baltimore, Md.) The hollow structure is typically made of plastic. When the reusable ice substitute means is placed in a freezer, the refrigerant temperature is lowered. In the preferred embodiment, the refrigerant is a liquid at room temperature, but becomes frozen after a period of time in the freezer.

The storage base 12 has at least one storage receptacle 29. Preferably, the base 12 has a plurality of receptacles 29 which are sized to accommodate a desired item. In the preferred embodiment, the receptacles 29 are substantially cylindrical in shape and sized to receive a typical twelve-ounce beverage can 25. The diameter of each receptacle 29 is slightly larger than the diameter of a beverage can. The length of each receptacle 29 is slightly shorter than the height of a beverage can. Since the top of each beverage can extends beyond the front surface of the compartment base 12, the beverage cans 25 can be easily inserted and removed.

It is notable that each receptacle 29 can be designed to accommodate a different item. For example, a first receptacle can be sized for a twelve-ounce beverage can, a second receptacle can accommodate a sixteen-ounce bottle, a third receptacle etc.

Figure 2:
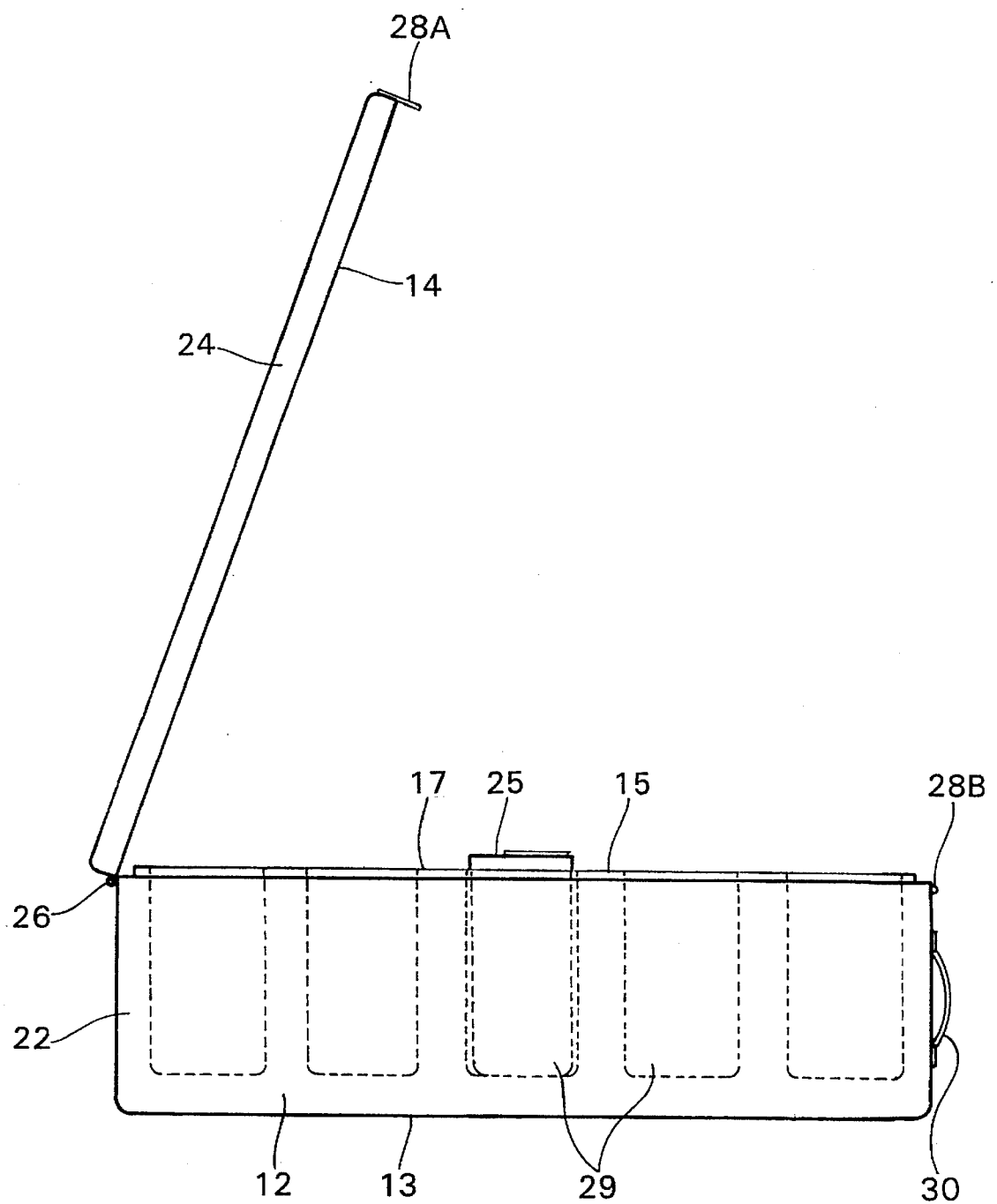
FIG. 2 is a side view of the cooler of FIG. 1.

The cooler 10 also includes a lid 14 or means for closing the opened front side 15, as seen in FIGS. 1, 2 and 3. The lid 14 is also preferably composed of a reusable ice substitute means. The lid 14 may have a one interior depression 39 to accommodate the top portions of all of the beverage cans 25, as shown in FIG. 1. In an alternate embodiment, shown in FIG. 4, the lid 14 may have a nook 44 corresponding to each receptacle 29. Each nook 44 is preferably substantially cylindrical in shape and sized to receive the portion of the beverage can which extends above the reusable ice substitute means of the storage base 12. Therefore, the diameter of each nook 44 is slightly larger than the diameter of a beverage can. The depth of each nook 44 depends on the height of the corresponding receptacle 29, but should be sufficiently deep to completely encapsulate the beverage can 25.

When the lid 14 is in its closed condition (see FIG. 3), each nook 44 is aligned with its associated receptacle 29 in the base 12. In this manner, the beverage can 25 is completely surrounded (i.e., sides, top and bottom) by a surface of a reusable ice substitute.

In the preferred embodiment, the storage base 12 includes a lip or raised edge 17 around its periphery as shown in FIGS. 1 and 3. In addition, the lid 14 includes a recess 19 for mateable engagement with the lip 17 of the storage base 12 as shown in FIG. 1. The lip 17 and the recess 19 are designed for frictional engagement. This ensures a tight seal between the lid 14 and the storage base 12 for preventing the penetration of heated air into the interior of the cooler. Other sealants or gaskets may be used—either in addition to or in place of the lip 17 and recess 19—to ensure that the beverage cans are insulated from the warm ambient air.

The storage base 12 may be molded to fit inside a substantially rigid storage case 22. The case 22 is preferably made of an insulative material which protects the chilled reusable ice substitute means from the ambient surroundings. The rigid base case 22 also prevents the accidental piercing of the storage base 12, thereby reducing the possibility that refrigerant will be leaked. A rigid lid case 24 may also be used to insulate the lid 14. (It should be noted that the storage base 12 and lid 14 may be designed to be permanently affixed within their respective rigid cases 22, 24, or made to be detachable from their respective rigid cases.)

Hinges 26 may be used to connect the lid case 24 to the storage case 22. This allows for a smooth mating of the lid 14 with the storage base 12. A means of securing (e.g., a clasp 28) the rigid lid case 24 to the rigid base case 22 may be provided. The base clasp piece 28B may be secured to the exterior surface of the rigid base case 22 in a suitable position. Likewise, pivoting clasp piece 28A may be attached to the rigid lid case 24 in a position operatable with the base piece 28B. The clasp 28 will prevent the beverage cans 25 from accidentally forcing the lid 14 off of the storage base 12.

A handle 30 may be attached to the rigid case 22 to aid in the carrying of the cooler 10. The handle 30 may be placed on any side of the storage case 22.

In the preferred embodiment, the lid 14 can be completely separated from the storage base 12; the two separate pieces can then more easily be stored within a freezer compartment. This separable lid feature allows more flexibility with respect to the operation, storage and transportation of the cooler 10. In addition, the lid 14 and storage base 12 can be made to be detachable from their respective rigid cases 24, 22. This feature would decrease the period of time needed to freeze the refrigerant.

A description of the use of the subject cooler follows. The preferred method would be to separate the lid case 24 from the base case 22. Next, the lid 14 should be detached from the lid case 24; and the storage base 12 should be detached from the rigid base case 22. The storage base 12 and lid 14 are then placed in a freezer. After the refrigerant has frozen, the base 12 and lid 14 are removed from the freezer. The lid 14 and base 12 are then re-inserted into their respective rigid cases 24, 22. The lid case 24 is then attached to the base case 22. The beverage cans 25 are inserted into the receptacles 29 of the storage base 12. The lid 14 is closed, completely surrounding the beverage containers with the reusable ice substitutes. Since all surfaces of each beverage can 25 are in direct contact with a surface of a reusable ice substitute, the beverage cans 25 are quickly cooled to a low temperature. Further, this low temperature is maintained for an extended period of time. The subject cooler minimizes the period of time needed to cool the beverage cans and maximizes the period of time during which the beverage containers are maintained at a low temperature.

There are several factors which impact on the outer dimensions of the storage base 12. The number of beverage containers which are to be cooled and transported is a primary consideration. In addition, it is preferable to size the cooler 10 for conveniently fitting into an average sized freezer compartment. Another primary consideration may be to size the cooler 10 (namely the lid 14 and the base 12) for use in a particular activity—for example, retention within a golf bag.

Figure 5A:
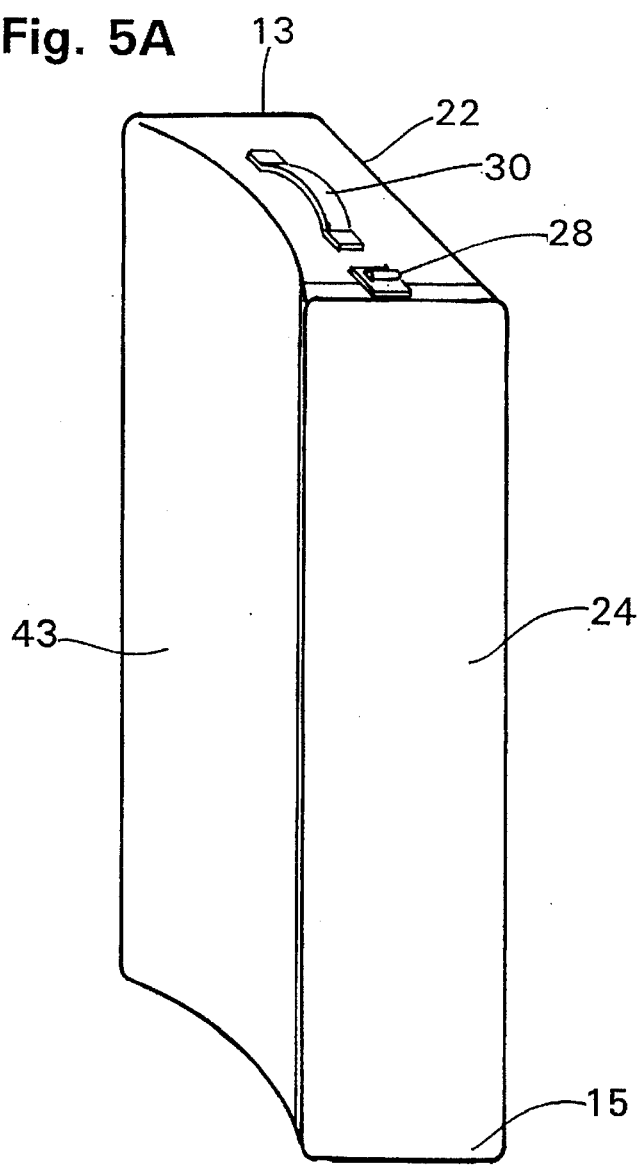
FIG. 5A is a perspective view of a portable cooler in accordance with the instant invention having a sculpted side to accommodate its transportation in a golf bag.
Figure 5B:
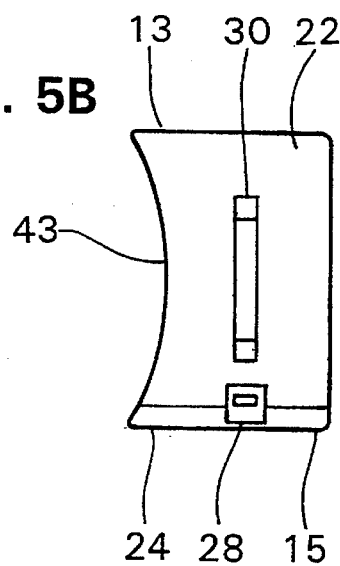
FIG. 5B is a top view of the portable cooler of FIG. 5A.
Figure 6:
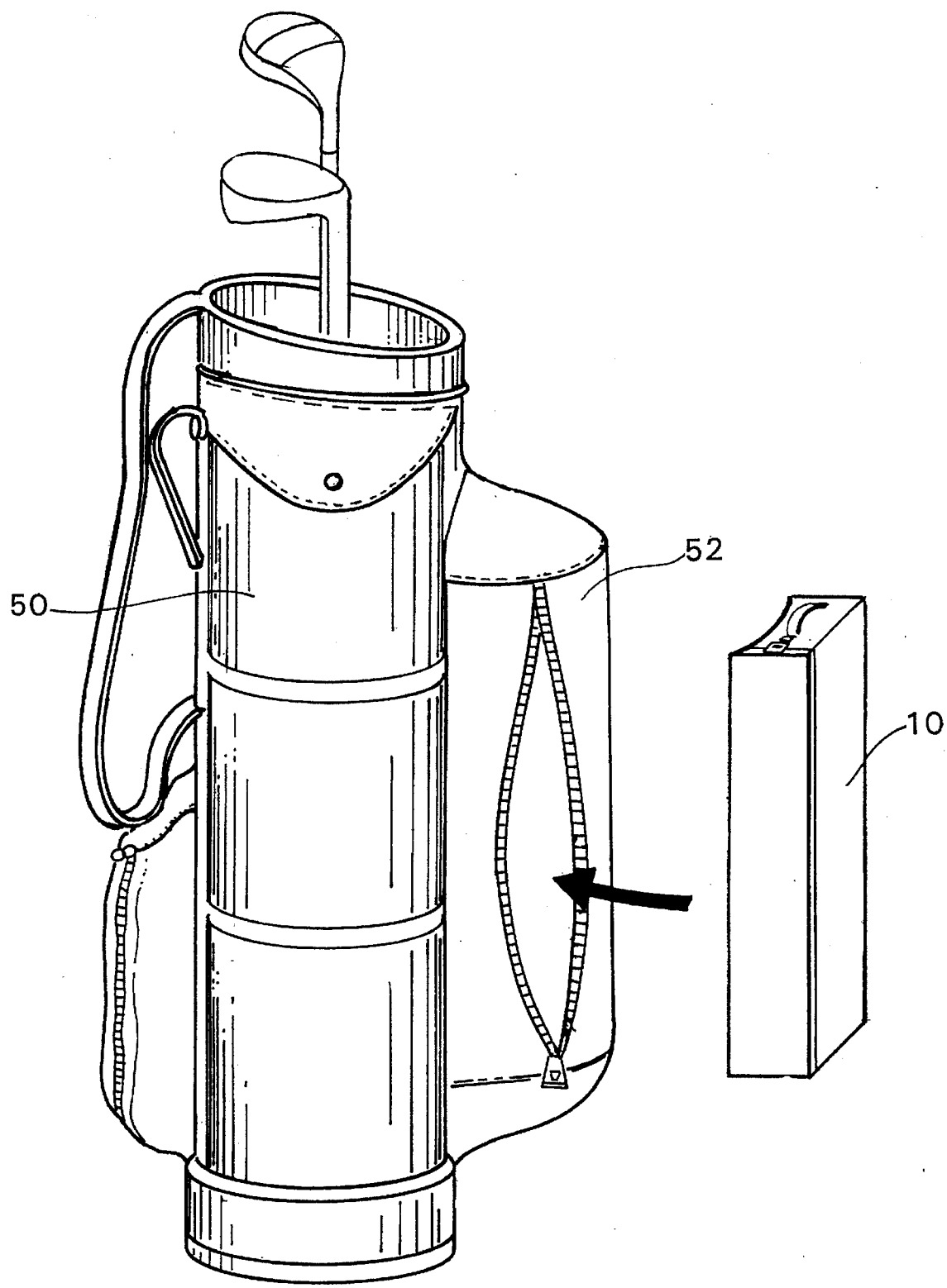
FIG. 6 is a view of the portable cooler in relation to a side storage compartment of a golf bag.

Since a golf bag 50 as shown in FIG. 6 usually has long, relatively narrow peripheral sid compartments 52, it is preferable to design the cooler 10 to have a substantially narrow rectangular shape having a concave side 43, as shown in FIG. 5.

The rigid case 22 and the storage base 12 are molded with a concave side for following the periphery of a golf bag 50. The degree of the arc of the concave side 43 can be selected to custom fit the cooler 10 for a particular golf bag. By placing the cooler's handle 30 on the top side of rigid case 22, the cooler 10 can be easily slid into and out of a storage compartment 52, of a golf bag. A means of retaining (e.g., a strap) the subject cooler within the compartment of the golf bag may also be incorporated into the case 22.

The axial length or longitudinal dimension of the cylindrical storage receptacle 29 is disposed generally horizontally in the storage base 12 and is substantially tangential to the concave side 43 of the cooler 10. The beverage can 25 is inserted into the opened end of the base portion 12 such that the longitudinal dimension of the beverage can 25 is also substantially tangetial to the concave side 43 of the cooler 10. This arrangement allows easy access to and removal of the beverage can 25 while substantially the entire cooler remains inside a compartment of the golf bag. That is, the lid may be opened and beverage cans may be placed in or removed from the storage base 12 while the cooler 10 remains out of sight in a golf bag compartment.

Even though particular embodiments of the present invention have been illustrated and described herein, this is not intended to limit the invention. It is therefore to be understood that modification and variation of the embodiments described above may be made without departing from the spirit or scope of the invention.

I claim:

1. A portable cooler, for use with a golf bag, for storing, chilling and transporting a container, the cooler comprising:
   (a) a storage base having an outer side, a concave inner side, top, bottom and back sides, which are closed and a front side which is open, the storage base having a horizontal receptacle that is substantially tangential to said concave inner side for receiving the container, the storage base being made of reusable ice substitute means said concave inner side defining means for positioning the portable cooler into close proximity with the periphery of the golf bag when said portable cooler is inserted lengthwise into a peripheral side compartment of the golf bag; and
   (b) means which communicate with the storage base for sealing the open front side.

2. The cooler of claim 1, wherein the storage base further comprises lip means around the periphery of the open end, and wherein the closing means further comprises a recess means around its periphery, said recess means being sized and disposed for mateable engagement with the lip means, thereby providing an improved seal between the storage base and the closing means.

3. The cooler of claim 2 wherein the reusable ice substitute means is activated by placing said cooler in a freezer for a period of time.

4. The cooler of claim 2 wherein the cooler is sized for storage in an average freezer.

5. The cooler of claim 2 further comprising an insulative material having a pocket therein, the pocket sized and disposed for receiving the cooler, thereby insulating the cooler.

6. The cooler of claim 5 wherein the insulative material is substantially rigid.

7. The cooler of claim 6 wherein the insulative material further comprises a closure means attached to its outer side for facilitating the releasable engagement of the cooler with the golf bag.

8. The cooler of claim 2 wherein the storage base is sized and disposed for receiving five containers in a stackable arrangement.

9. The cooler of claim 2 further comprising a handle attached to the top side of the cooler for facilitating the handling and transportation of the cooler.

10. The cooler of claim 1 wherein the cooler is designed to be stored within a compartment of a golf bag.

11. The cooler of claim 10 wherein the concave surface has a radius adapted for receiving a portion of said golf bag.

12. The cooler of claim 11 wherein said open end comprises a plurality of receptacles for individually receiving each. container.

13. The cooler of claim 12 wherein the closing means is a lid having a plurality of nooks, each nook being aligned with an associated receptacle for completely encapsulating the container.

14. The cooler of claim 1 wherein said open end comprises a plurality of receptacles for individually receiving each container.

15. The cooler of claim 14 wherein the closing means is a lid having a plurality of nooks, each nook being aligned with an associated receptacle for completely encapsulating the container.

16. A portable cooler for storing, chilling and transporting a beverage can, comprising:
   (a) a base portion having a concave side with a radius approximate that of a radius of a golf bag and an open front side proximate said concave side, wherein said radius of the concave side defines means for matingly engaging the periphery of the golf bag when the portable cooler is inserted length wise into a peripheral side compartment of the golf bag, said base portion having a substantially cylindrical receptacle for accepting the beverage can, the axial dimension of said receptacle being substantially tangential to the concave side and the depth of said receptacle allowing, at least a portion of the beverage can to extend beyond said receptacle;
   (b) a lid which communicates with the open front side of the base and that covers the portion of the beverage can which extends beyond said receptacle; and
   (c) a refrigerant disposed in said lid.

17. The cooler of claim 16, further comprising:
   (c) a lip around the periphery of a side of the base portion containing the receptacle; and
   (d) a recess around the periphery of the lid, said recess being sized and disposed for mateable engagement with the lip, thereby providing an improved seal between the base portion and the lid.

18. The cooler of claim 15 wherein the lid is substantially rectangular in shape.

19. The cooler of claim 17 wherein the lid is substantially rectangular in shape.

* * * * *